(12) United States Patent
Johns et al.

(10) Patent No.: US 8,678,644 B2
(45) Date of Patent: Mar. 25, 2014

(54) HOT GAS PATH MEASUREMENT

(75) Inventors: David Richard Johns, Simpsonville, SC (US); Ariel Harter Lomas, Simpsonville, SC (US); James Stewart Phillips, Easley, SC (US)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 13/210,849

(22) Filed: Aug. 16, 2011

(65) Prior Publication Data

US 2013/0042668 A1   Feb. 21, 2013

(51) Int. Cl.
*G01K 1/10* (2006.01)
*G01K 1/14* (2006.01)

(52) U.S. Cl.
USPC .................................. 374/100; 60/803

(58) Field of Classification Search
USPC ................... 73/25.05; 374/1, 141, 144
See application file for complete search history.

(56) References Cited

U.S. PATENT DOCUMENTS

| | | | |
|---|---|---|---|
| 6,274,215 B1 * | 8/2001 | Brainch et al. | 428/77 |
| 6,503,574 B1 * | 1/2003 | Skelly et al. | 427/446 |
| 6,838,157 B2 | 1/2005 | Subramanian | |
| 6,887,529 B2 * | 5/2005 | Borneman et al. | 427/448 |
| 7,004,622 B2 | 2/2006 | Hardwicke et al. | |
| 7,078,073 B2 * | 7/2006 | Rigney et al. | 427/142 |
| 7,303,374 B2 * | 12/2007 | Li et al. | 416/61 |
| 7,327,472 B2 | 2/2008 | Riza et al. | |
| 7,449,251 B2 | 11/2008 | Arikawa et al. | |
| 7,572,524 B2 * | 8/2009 | Sabol et al. | 428/701 |
| 7,582,359 B2 | 9/2009 | Sabol et al. | |
| 7,604,402 B2 | 10/2009 | Boese et al. | |
| 7,859,100 B2 | 12/2010 | Torigoe et al. | |
| 7,969,323 B2 | 6/2011 | Mitchell et al. | |
| 2005/0198967 A1 * | 9/2005 | Subramanian | 60/803 |
| 2005/0287386 A1 | 12/2005 | Sabol et al. | |
| 2006/0056959 A1 | 3/2006 | Sabol et al. | |
| 2008/0224254 A1 * | 9/2008 | Couillard et al. | 257/506 |
| 2009/0065051 A1 * | 3/2009 | Chan et al. | 136/256 |
| 2010/0101526 A1 * | 4/2010 | Schaefer et al. | 123/193.2 |
| 2010/0117859 A1 | 5/2010 | Mitchell et al. | |
| 2010/0226756 A1 | 9/2010 | Mitchell et al. | |
| 2010/0226757 A1 * | 9/2010 | Mitchell et al. | 415/118 |

* cited by examiner

*Primary Examiner* — Lisa Caputo
*Assistant Examiner* — Nasir U Ahmed
(74) *Attorney, Agent, or Firm* — Cantor Colburn LLP

(57) ABSTRACT

A hot gas path measurement apparatus is provided and includes a substrate having a coating applied on a surface thereof such that the coating is interposed between the substrate and a hot gas path; and a measurement device fixed in a recess formed in the substrate, the measurement device including a sensor, and a holder configured to position the sensor in an alignment condition with a plane of a surface of the coating or at least partially within a span of the hot gas path.

17 Claims, 3 Drawing Sheets

HOT GAS PATH MEASUREMENT

BACKGROUND OF THE INVENTION

The subject matter disclosed herein relates to hot gas path temperature measurement.

When validating heat transfer predictions of, for example, hot gas path components of a gas turbine engine, there are several unknown variables. These include external boundary temperatures, external heat transfer coefficients, internal boundary temperatures, internal heat transfer coefficients and material thicknesses and thermal conductivities. That is, when temperatures alone are thought to be known, an analyst still may not have enough information to tune each of the other variables in order to assure temperature predictions are correct. Direct measurement of the gas temperature, however, allows the analyst to directly measure one of these unknown quantities. This is particularly useful in areas that exhibit film cooling where external boundary (film) temperatures are less well known.

Direct measurement of gas temperatures in gas turbine engines has previously been achieved by way of temperature sensors being fixed within base metal of hot gas path components. This requires drilling holes to add the instrumentation to the parts, which introduces stress concentrations that reduce part life. Moreover, the fixing process has often been intrusive and operations of the temperature sensors have generally required data acquisition systems with active monitoring.

BRIEF DESCRIPTION OF THE INVENTION

According to one aspect of the invention, a hot gas path measurement apparatus is provided and includes a substrate having a coating applied on a surface thereof such that the coating is interposed between the substrate and a hot gas path; and a measurement device fixed in a recess formed in the substrate, the measurement device including a sensor, and a holder configured to position the sensor in an alignment condition with a plane of a surface of the coating or at least partially within a span of the hot gas path.

According to another aspect of the invention, a hot gas path temperature measurement apparatus is provided and includes a base metal having a thermal barrier coating (TBC) applied on a surface thereof such that the TBC is interposed between the base metal and a hot gas path and a temperature measurement device fixed in a recess formed in the base metal, the temperature measurement device including one or more of a thermocouple and a thermal crystal, and a holder configured to position the one or more of the thermocouple and the thermal crystal in an alignment condition with a plane of a surface of the TBC or at least partially within a span of the hot gas path.

According to yet another aspect of the invention, a method for use in a measurement of a hot gas path is provided and includes applying a coating to a surface of a substrate such that the coating is interposed between the substrate and a hot gas path, forming a recess in the coating and the substrate and fixing a measurement device in the recess such that a sensor thereof is in an alignment condition with a plane of a surface of the coating or at least partially within a span of the hot gas path.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
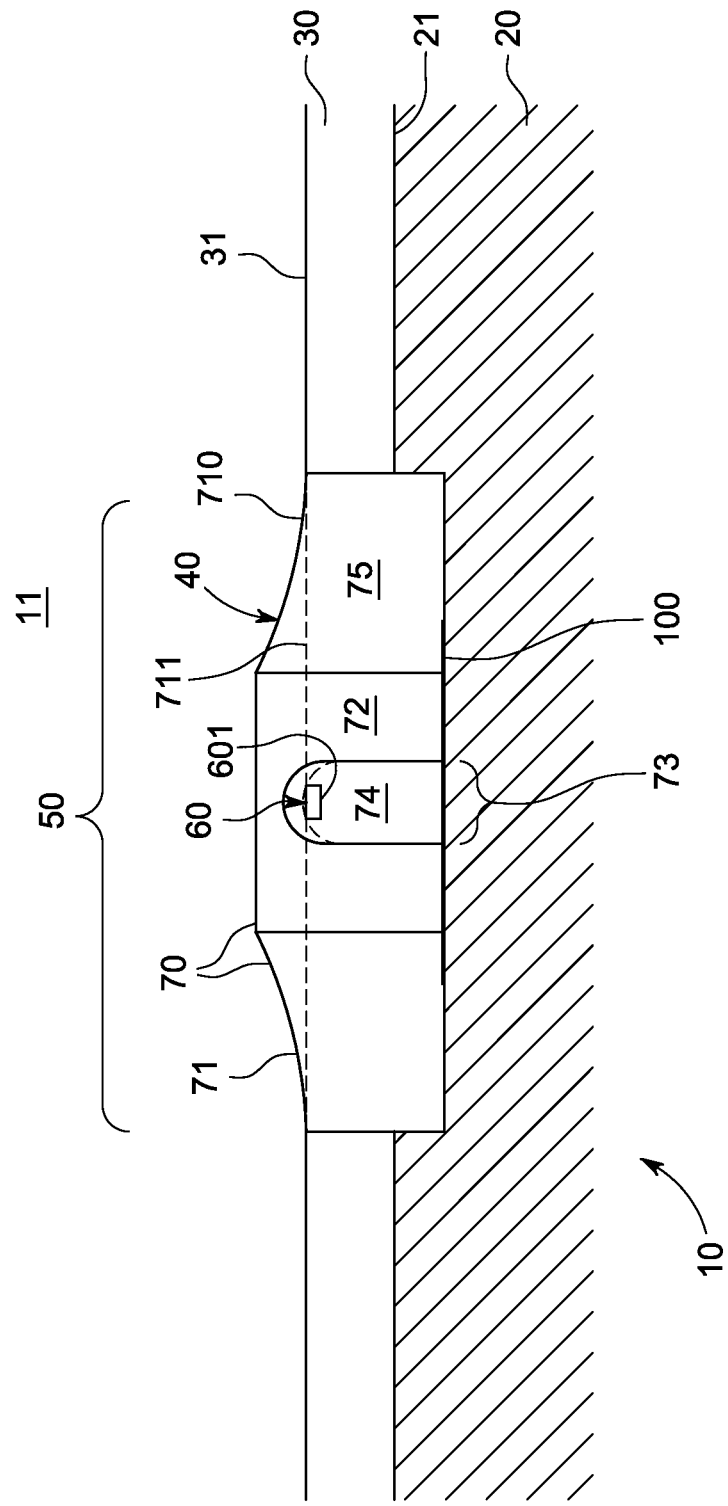
FIG. 1 is a side view of a hot gas path measurement apparatus.

With reference to FIG. 1, a hot gas path measurement apparatus 10 is provided to provide a direct measurement of a condition of a hot gas path 11. More particularly, the apparatus 10 provides a substantially direct measurement of a temperature of the hot gas path 11 with thermal conduction limited and the measurement therefore being substantially non-reflective of a temperature of surrounding components.

The apparatus 10 includes a substrate 20 and a measurement device 40. The substrate 20 has a surface 21 on which a coating 30 is applied such that the coating 30 is interposed between the substrate 20 and the hot gas path 11. The measurement device 40 is fixed in a recess 50 formed in the coating 30 and the substrate 20 and is configured to measure a condition of the hot gas path 11.

The measurement device 40 includes a sensor 60 for sensing a measuring the condition and a holder 70. The holder 70 positions the sensor 60 proximate to the hot gas path 11 so that the condition measurement can be executed directly or substantially directly without being reflective of a condition measurement of the coating 30 or the substrate 20 and without risking loss of the measurement device 40 in the hot gas path 11. More particularly, the holder 70 positions the sensor 60 in an alignment condition with a plane of a surface 31 of the coating 30 or at least partially within a span of the hot gas path 11. The positioning of the sensor 60 is achieved by the holder 70 being formed with a raised profile 711 relative to the plane of the surface 31 of the coating 30. This raised profile 711 has concave edges and/or other aerodynamic features such that the sensor 60 is disposed at the plane of the surface 31 of the coating 30 or closer to the hot gas path 11 (i.e., within the span of the hot gas path 11) and such that an aerodynamic disturbance of the hot gas path 11 is limited.

In accordance with an alternate embodiment, the holder 70 may have a substantially flat profile 710 that is substantially flush with the plane of the surface 31 of the coating 30. In this case, the sensor 60 is positioned at or near a surface of the holder 70 with little or no holder 70 material being interposed between the sensor 60 and the hot gas path 11.

The holder 70 includes an insulator 72 that provides thermal insulation and, in some cases, electrical isolation to the sensor 60 and has a recess 73 formed therein. The recess 73 is elongate and extends from a surface of the holder 70 through the body of the holder 70 to a portion of the holder 70 near an opposite surface. The holder 70 further includes a holding agent 74 disposed within the recess 73 to secure the sensor 60 therein and a coating patch 75 surrounding the insulator 72. The holding agent 74 can be injected into the recess 73 and cured to secure the sensor 60 therein. The coating patch 75 occupies space surrounding the insulator 72 within the recess 50 formed in the coating 30 and the substrate 20.

Figure 2:
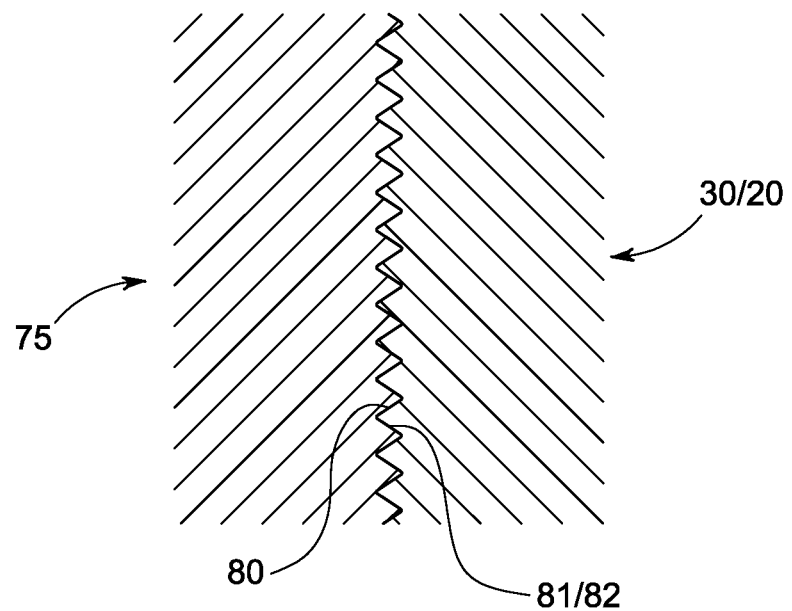
FIG. 2 is an enlarged view of a rough edge of a holder of the measurement apparatus of FIG. 1.
Figure 3:
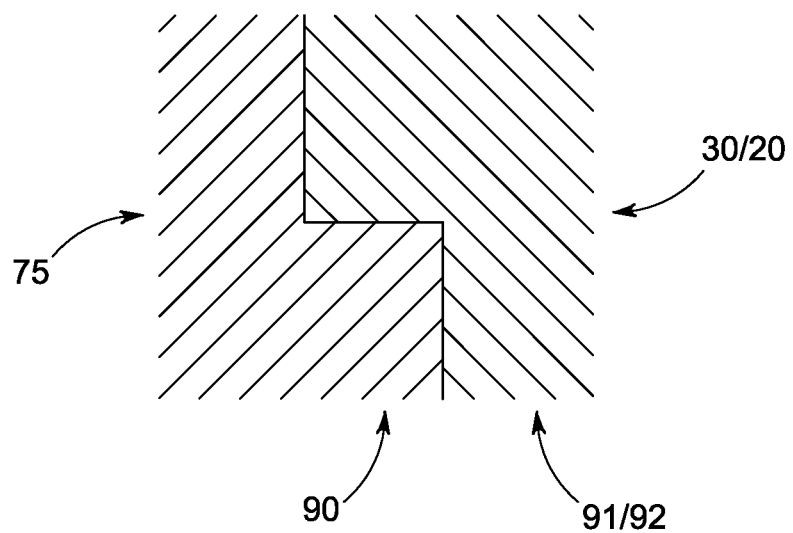
FIG. 3 is an enlarged view of a flange of the holder of the measurement apparatus of FIG. 1.

The holder 70 can be secured within the recess 50 in various manners and combinations thereof. For example, with reference to FIG. 2, at least one or both of the insulator 72 and the coating patch 75 may have a rough exterior surface 80 mating with a correspondingly rough interior surface 81, 82 of the coating patch 75 and the coating 30/substrate 20, respectively. Also, with reference to FIG. 3, at least one or both of the insulator 72 and the coating patch 75 may include a flange 90, which is received in a receiving unit 91, 92 of the coating patch 75 and the coating 30/substrate 20, respectively. Still further, as shown in FIG. 1, a bonding agent 100 may be disposed to bond the holder 70 to the substrate 20 and/or the coating 30.

The sensor 60 may include any type of sensor for various condition measurements. In particular, where the condition measurement is a measurement of a temperature of the hot gas path 11, the sensor 60 may be a temperature sensor including a thermocouple and one or more thermocouple junctions disposed within the recess 73 or a thermal crystal as will be described below.

In accordance with embodiments, the apparatus 10 is provided to measure a temperature of the hot gas path 11 defined through a component of a gas turbine engine. In such cases, the substrate 20 includes a base metal or metallic alloy, the coating 30 includes a thermal barrier coating (TBC) having one or more layers and the measurement device 40 is formed to withstand the temperatures and pressures associated with turbine operations. In particular, the sensor 60 may include one or more of a thermocouple and a thermal crystal 601, which exhibits temperature sensitive material/mechanical changes that can be relied upon for hot gas path 11 temperature measurements but do not require the use of data acquisition systems or active monitoring. Also, the insulator 72 may include quartz or another similar material, which can be machined with fine tolerances and can withstand the turbine environment, the holding agent may include cement or another similar material and the coating patch 75 may include TBC coating that may or may not be a similar material as that of the coating 30.

Figure 4:
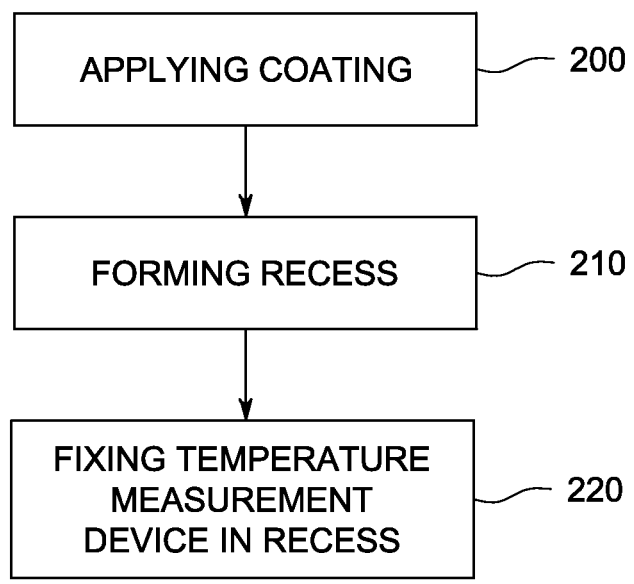
FIG. 4 is a flow diagram illustrating a method for use in a measurement of a hot gas path.

With reference to FIG. 4, in accordance with further aspects, a method for use in a temperature measurement of a hot gas path is provided. The method includes applying a coating 30 to a surface 21 of a substrate 20 such that the coating 30 is interposed between the substrate 20 and a hot gas path 11 (200), forming a recess 50 in the coating 30 and the substrate 20 (210) and fixing a temperature measurement device 40 in the recess 50 such that a temperature sensor 60 thereof is proximate to the hot gas path 11 (220), in an alignment condition with a plane of a surface 31 of the coating 30 or at least partially within a span of the hot gas path 11. The method may further include disposing the temperature sensor 60 at a plane of a surface 31 of the coating 30 or closer to the hot gas path 11. In addition, where the temperature sensor 60 includes a thermal crystal 601, the method may further include locating the thermal crystal 601 following exposure thereof to the hot gas path 11 and inspecting the thermal crystal 601 to measure a temperature of the hot gas path 11.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A hot gas path measurement apparatus, comprising:
   a substrate having a coating applied on a substrate surface thereof such that the coating is interposed between the substrate and a hot gas path; and
   a measurement device fixed in a recess formed in the substrate, the recess being formed such that portions of the substrate surface outside the recess are disposed at a first plane and portions of the substrate surface in the recess are disposed at a second plane and are recessed from the first plane, the measurement device including:
   a sensor, and
   a holder configured to position the sensor in an alignment condition with a plane of a surface of the coating or at least partially within a span of the hot gas path, the holder comprising:
   an insulator having an insulator recess formed therein to extend from the second plane to at least the plane of the surface of the coating; and
   a holding agent disposed to secure the sensor in the insulator recess in the alignment condition.

2. The hot gas path measurement apparatus according to claim 1, wherein a surface of the holder has a raised profile relative to the plane of the surface of the coating.

3. The hot gas path measurement apparatus according to claim 1, wherein a surface of the holder is substantially flush with the plane of the surface of the coating.

4. The hot gas path measurement apparatus according to claim 1, wherein the holder comprises a coating patch surrounding the insulator.

5. The hot gas path measurement apparatus according to claim 1, further comprising a bonding agent to bond the holder to the substrate and/or the coating.

6. The hot gas path measurement apparatus according to claim 1, wherein the holder has a rough exterior surface.

7. The hot gas path measurement apparatus according to claim 1, wherein the sensor comprises a thermocouple.

8. A hot gas path temperature measurement apparatus, comprising:
   a base metal having a thermal barrier coating (TBC) applied on a base metal surface thereof such that the TBC is interposed between the base metal and a hot gas path; and
   a temperature measurement device fixed in a recess formed in the base metal, the recess being formed such that portions of the base metal surface outside the recess are disposed at a first plane and portions of the base metal surface in the recess are disposed at a second plane and are recessed from the first plane, the temperature measurement device including:
   one or more of a thermocouple and a thermal crystal disposed in an alignment condition with a plane of the surface of the TBC or at least partially within a span of the hot gas path, and
   a holder configured to position the one or more of the thermocouple and the thermal crystal in the alignment condition with the plane of the surface of the TBC or at least partially within the span of the hot gas path, the holder comprising:
   an insulator having an insulator recess formed therein to extend from the second plane to at least the plane of the surface of the TBC; and a holding agent disposed to secure the sensor in the insulator recess in the alignment condition.

9. The hot gas path temperature measurement apparatus according to claim 8, wherein the holder has a raised profile relative to the plane of the surface of the TBC.

10. The hot gas path measurement apparatus according to claim 8, wherein the holder is substantially flush with the plane of the surface of the TBC.

11. The hot gas path temperature measurement apparatus according to claim 8, wherein the holder comprises a TBC patch surrounding the insulator.

12. The hot gas path temperature measurement apparatus according to claim 11, wherein the insulator comprises quartz.

13. The hot gas path temperature measurement apparatus according to claim 8, wherein the holding agent comprises cement.

14. The hot gas path temperature measurement apparatus according to claim 8, further comprising a bonding agent to bond the holder to the base metal and/or the TBC.

15. The hot gas path temperature measurement apparatus according to claim 8, wherein the holder has a rough exterior surface.

16. A method for use in a measurement of a hot gas path, the method comprising:

applying a coating to a surface of a substrate such that the coating is interposed between the substrate and a hot gas path;

forming a recess in the coating and the substrate such that portions of the surface of the substrate outside the recess are disposed at a first plane and portions of the surface of the substrate in the recess are disposed at a second plane and are recessed from the first plane; and fixing a measurement device in the recess such that a sensor thereof is in an alignment condition with a plane of a surface of the coating or at least partially within a span of the hot gas path, the fixing comprising:

disposing an insulator in the recess, the insulator having an insulator recess formed therein to extend from the second plane to at least the plane of the surface of the coating; and securing the sensor in the insulator recess in the alignment condition with a holding agent.

17. The method according to claim 16, wherein the sensor comprises one or more of a thermocouple and a thermal crystal, the method further comprising:

locating the one or more of the thermocouple and the thermal crystal following exposure to the hot gas path; and inspecting the one or more of the thermocouple and the thermal crystal to measure a temperature of the hot gas path.

* * * * *